Patented June 11, 1929.

1,717,242

UNITED STATES PATENT OFFICE.

HERMANN MÜLLER, OF BASEL, SWITZERLAND, ASSIGNOR TO FIRM J. R. GEIGY S. A., OF BASEL, SWITZERLAND.

DYEING AND PRINTING.

No Drawing. Original application filed June 30, 1924, Serial No. 723,393, and in Germany July 23, 1923. Divided and this application filed September 19, 1925. Serial No. 57,447.

This application is a division of the application Ser. No. 723,393 filed June 30, 1924.

In the specifications of U. S. Letters Patent No. 1,485,790, and its divisional application Ser. No. 644,244, it is stated that dyestuffs in watery solution can be fixed fast at ordinary temperatures on the material to be dyed by the action of chlorinated acetic acid, glycolic acid, lactic acid, malic acid, oxalic acid or phosphoric acid. I have now discovered that neutral substances, particularly ethylenethiodiglycol of the formula

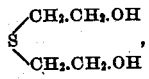

also have the same desirable property, and furthermore have the great advantage that by using them the strongly acid solutions and pastes with their unpleasant consequences are avoided. The watery or alcoholic solutions prepared with ethylenethiodiglycol have no corrosive effect on the membrane or mucous membrane of the eyes and the respiratory organs. This advantage is of special importance in the spraying process. Furthermore the dyestuff solutions containing monochloracetic acid owing to their high acid content cannot be used for printing silk highly charged with tin, whilst the new dyestuff solutions containing ethylenethiodiglycol can be used satisfactorily for this purpose. Such dyestuff solutions prepared with alcohol will also dye fast acetate silk by spraying at ordinary temperatures.

In German Patent No. 339,690 and in its patent of addition No. 340,552 the addition of thiodiglycol as solvent for insoluble dyestuffs is mentioned, in which patents however as in the usual process, printing is effected with subsequent steaming, whilst in this case on the other hand the dyestuff solutions are only used cold, or at ordinary temperatures.

The printing, dyeing, spraying of wool, silk, cotton and other textile fabrics as well as wood, feathers, hair, paper, straw and artificial substances is accomplished as exemplified in the following examples.

EXAMPLE I.

*Printing and dyeing for cotton and silk mixed with cotton.*

*a. Printing.*

1 gr. of basic dyestuff (for instance setocyanine) is dissolved hot in
32 gr. of water and
4,5 gr. of acetic acid (of 80 per cent), then add
10 gr. of ethylenethiodiglycol,
2,5 gr. of tannin and
50 gr. of starch-tragacanthgum-thickening.

———
100 gr.

The material is printed with this printing dye, well dried, and without steaming is passed through a cold or luke-warm tartar emetic bath, which as usual contains 10 gr. of tartar emetic to 1 litre of liquor. Then it is well washed and soaped.

*b. Dyeing bath corresponding to Example I for cotton and silk mixed with cotton.*

1 gr. of basic dyestuff (for instance setocyanine) is dissolved hot in
32 gr. of water and
4, 5 gr. of acetic acid (of 80 per cent), then add
10 gr. of ethylenethiodiglycol
2, 5 gr. of tannin,
40 gr. water and
10 gr. of starch-tragacanthgum-thickening.

———
100 gr.

The material is passed through this dyeing bath on the padding machine at ordinary temperature, and pressed out, so that the wet material shows a 100 per cent increase in weight. It is then well dried and without steaming is passed through the usual bath of tartar emetic, washed and soaped.

EXAMPLE II.

*Printing and dyeing for wool and silk.*

*a. Printing.*

- 1 gr. of acid dyestuff (for instance acid orange or metanil yellow) and
- 2,5 gr. of acetic acid (of 80 per cent) are dissolved in
- 36,5 gr. of hot water, then add
- 10 gr. of ethylenethiodiglycol and
- 50 gr. of starch-tragacanthgum-thickening.

100 gr.

The material is printed as usual, well dried and washed without steaming.

*b. Dyeing bath corresponding to Example II for wool and silk.*

- 1 gr. of acid dyestuff (for instance acid orange or metanil yellow) and
- 2,5 gr. of acetic acid (of 80 per cent) are dissolved in
- 36,5 gr. of hot water, then add
- 10 gr. of ethylenethiodiglycol,
- 40 gr. of water and
- 10 gr. of starch-tragacanthgum-thickening.

100 gr.

The material is passed through this dyeing bath at ordinary temperature on the padding machine and pressed out, so that the wet material shows a 100 per cent increase in weight. It is then well dried and washed without steaming.

EXAMPLE III.

*Spraying process for cotton, silk mixed with cotton, artificial materials, etc.*

- 1 gr. of dyestuff, for instance safranine extra soluble, is dissolved in
- 25 gr. of water, then add
- 25 gr. of alcohol (of 85 per cent)
- 10 gr. of ethylenethiodiglycol,
- 6 gr. of alcoholic tannin (2 parts of tannin dissolved in 1 part of alcohol of 85 per cent) and
- 33 gr. of alcohol (of 85 per cent).

100 gr.

The material is sprayed with the quickly drying alcoholic dyestuff solution. After completely drying it is passed without steaming through tartar emetic and washed.

What I claim is:

The herein described process for the production of dyeings and printings, consisting in introducing ethylenethiodiglycol into a dyestuff solution and applying same on the fibre without steaming operation.

In witness whereof I have hereunto signed my name this 1st day of September, 1925.

HERMANN MÜLLER.